(12) United States Patent
Bratkovski et al.

(10) Patent No.: US 8,664,605 B2
(45) Date of Patent: Mar. 4, 2014

(54) COVERT LABEL STRUCTURE

(75) Inventors: Alexandre M. Bratkovski, Mountain View, CA (US); Lars Helge Thylen, Huddinge (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 115 days.

(21) Appl. No.: 13/258,424

(22) PCT Filed: Apr. 28, 2009

(86) PCT No.: PCT/US2009/041892
§ 371 (c)(1),
(2), (4) Date: Sep. 21, 2011

(87) PCT Pub. No.: WO2010/126485
PCT Pub. Date: Nov. 4, 2010

(65) Prior Publication Data
US 2012/0033204 A1    Feb. 9, 2012

(51) Int. Cl.
*G02B 5/18* (2006.01)
*G06K 19/00* (2006.01)
*G01J 5/02* (2006.01)
(52) U.S. Cl.
USPC ................. 250/341.8; 235/494; 359/575

(58) Field of Classification Search
USPC ............. 235/494; 250/338.1, 339.01, 339.11, 250/341.1, 341.8; 283/94; 359/558, 563, 359/566, 569, 570, 575, 576
See application file for complete search history.

(56) References Cited

U.S. PATENT DOCUMENTS

| 6,927,885 | B2 | 8/2005 | Staub et al. | |
| 2004/0101168 | A1* | 5/2004 | Kostrzewski et al. | 382/115 |
| 2004/0240006 | A1 | 12/2004 | Staub et al. | |

FOREIGN PATENT DOCUMENTS

| CN | 1399764 | 2/2003 |
| EP | 1832439 | 9/2007 |
| WO | WO-0115064 | 3/2001 |
| WO | WO-01/54077 | 7/2001 |

* cited by examiner

*Primary Examiner* — Mark R Gaworecki

(57) ABSTRACT

A covert label structure comprising a three dimensional diffracting optical element layer (100) having a depth profile for producing a predetermined pattern, wherein different portions of a top surface of the diffracting optical element layer (100) have at least two different depths relative to a bottom surface of the diffracting optical element layer (100), wherein the depth profile spans across two dimensions of the top surface of the diffracting optical element layer (100), and wherein the top surface reflects light according to the predefined pattern and an overcoat layer (108) over the top surface of the diffracting optical element layer (100) wherein the overcoat layer (108) is opaque to at least one wavelength of light.

14 Claims, 6 Drawing Sheets

COVERT LABEL STRUCTURE

BACKGROUND

Labels are often placed on products distributed by a manufacturer or other entity for a variety of reasons, such as product identification. Another reason for labeling is to prevent counterfeit products and counterfeit packaging for products. For example, a manufacturer of a product may distribute hundreds of thousands of individual units of a particular product. Once the product is distributed, there are occasions where products need to be returned to the manufacturer or need to be recalled by the manufacturer. In such instances the manufacturer may receive false returns in the form of counterfeit products in counterfeit packaging made to look like an authentic product. In some cases the manufacturer may receive only counterfeit packaging that does not contain any product. When such false returns occur the manufacturer may be deceived into delivering false refunds in exchange for the false return. These false refunds may become a large expense to the manufacturer.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview of Discussion

Embodiments of the present technology provide covert label structures, methods for manufacturing a covert labeling structure, and methods for authenticating a covert labeling structure. In one embodiment, the covert label structure includes a diffracting optical element layer that reflects light in a predetermined pattern. In one embodiment, the covert label structure is covered with an overcoat layer that is transparent to light at a particular wavelength of light and is opaque to other wavelengths of light.

In one embodiment, the covert label structure can be authenticated by projecting light at the covert label structure at a particular wavelength of light that is designed to pass through the overcoat layer and reflect off of the diffracting optical element layer in a predetermined pattern. In one embodiment, the predetermined pattern is then detected by a camera and the predetermined pattern is checked against a database of authentic predetermined patterns.

The covert label structure can be used to label products in a way that the products can quickly be authenticated and identified using a handheld device or other technology. The covert label structures disclosed herein provide labeling for most any type of product. In one embodiment, the covert label structure is difficult to detect with the human eye due to its small size and an overcoat layer that is substantially smooth. Additionally, a covert label structure comprised of a diffracting optical element layer made of plastic and an overcoat layer made of ink can be manufactured inexpensively and is difficult to counterfeit.

It should be appreciated that the term "light" as used in the instant description of embodiments refers to electromagnetic radiation.

Embodiments of a Covert Label Structure

Figure 1A:
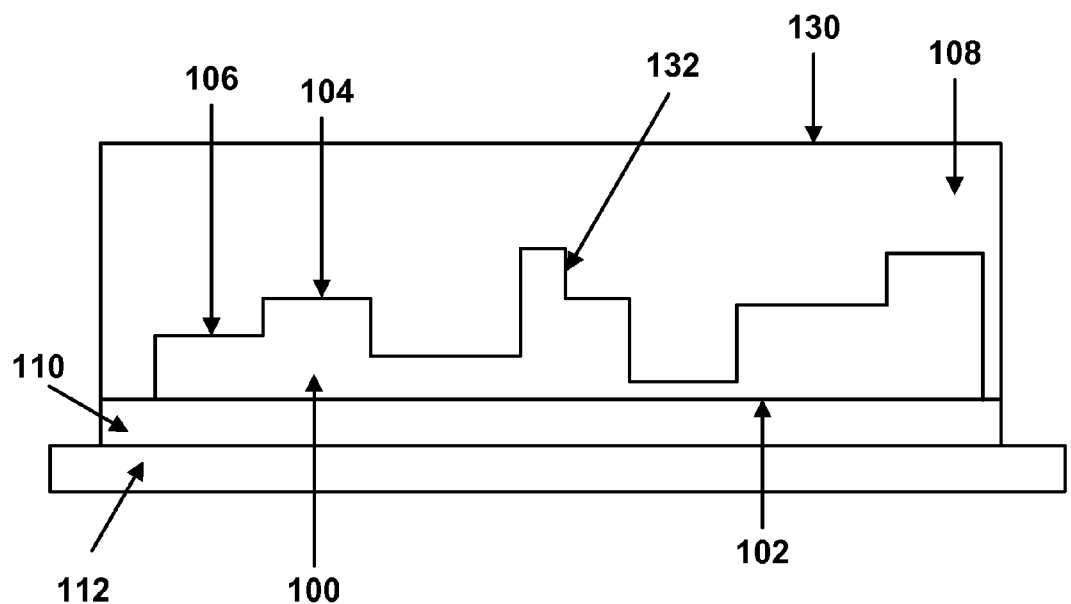
FIG. 1a illustrates an example of a covert label structure in accordance with an embodiment of the present technology.

Reference will now be made to FIG. 1a, a cross-section view of an example covert label structure shown in accordance with embodiments of the present technology. FIG. 1a includes a diffracting optical element layer 100, an adhesive layer 110, an object 112, and an overcoat layer 108. FIG. 1a comprises components and portions of the present technology that may or may not be used with different embodiments of the present technology and should not be construed to limit the present technology.

In one embodiment, diffracting optical element layer 100 is three dimensional and has a depth profile for producing a predetermined pattern of light. Diffracting optical element layer 100, in one embodiment, has a bottom surface 102 that is substantially flat relative to the top surfaces of diffracting optical element layer 100. In one embodiment, diffracting optical element layer 100 has different portions of a top surface such as top surfaces 104 and 106. In one embodiment, the depth profile comprises different portions of the top surface that have different depths relative to bottom surface 102. One such embodiment is depicted in FIG. 1a where top surface 104 has different depth relative to bottom surface 102 than top surface 106. In one embodiment, diffracting optical element layer 100 has more than two top surfaces that are different in depth relative to bottom surface 102.

FIG. 1a is drawn to depict top surfaces 104 and 106 as substantially flat and parallel to bottom surface 102 and sidewall 132 to be substantially flat and perpendicular to bottom surface 102. In one embodiment, top surfaces 104 and 106 and not substantially flat and parallel relative to bottom surface 102. In one embodiment, the surface of sidewall 132 is set at an angle not perpendicular to bottom surface 102. In one embodiment, diffracting optical element layer 100 comprises more than two sidewalls that create the depth profile for diffracting optical element layer 100. It should be appreciated that the different portions of the top surface of diffracting optical element layer 100 and the sidewalls of diffracting optical element layer 100 can be flat, smooth, rough, curved, arched, angled or any combination thereof. It should be appreciated that a portion of the top surface of diffracting optical element layer 100 and a sidewall of diffracting optical element layer 100 can meet at a perpendicular angle, an angle not perpendicular, or form a curved surface. In one embodiment, the portions of the top surface and the sidewalls of diffracting optical element layer 100 are formed with a feature precision of substantially 0.5 micrometers.

In one embodiment, the different portions of the top surfaces of diffracting optical element layer 100 span in two dimensions across the top surface of diffracting optical element layer 100. Additionally, in one embodiment, the top surface of diffracting optical element layer 100 is three dimensional as the top surface spans in two dimensions and is different portions are different thicknesses relative to bottom surface 102. It should be appreciated that the different portions of the top surface of diffracting optical element layer 100 and the sidewalls of diffracting optical element layer 100 make up a depth profile.

In one embodiment, diffracting optical element layer 100 is a kinoform. It should be appreciated that a kinoform has different surface relief heights in different zones of the kinoform surface, in order to optimize the first order diffraction efficiency in each zone. In one embodiment, kinoform is a computer generated hologram which only affects the phase of light. In one embodiment, diffracting optical element layer 100 is designed to process light by making light diffract, refract, channel in, focus in, or focus out. In one embodiment, the different portions of the top surface of diffracting optical element layer 100 reflect light according to a predefined pattern. In one embodiment, the predefined pattern is created using interference patterns of reflected light. In one embodiment, the interference patterns are created using diffraction when light is reflected off of the top surfaces and sidewalls of diffracting optical element layer 100. It should be appreciated that the predefined pattern can be any number of patterns which range from complicated to simple.

In one embodiment, diffracting optical element layer 100 reflects all light incident upon the top surfaces and sidewalls. In one embodiment, diffracting optical element layer 100 is only partially reflective of light incident upon the top surfaces and sidewalls. In one embodiment, diffracting optical element layer 100 reflects infrared light. In one embodiment, diffracting optical element layer 100 reflects infrared light that has a wavelength of substantially 850 nanometers. In one embodiment, diffracting optical element layer 100 does not have same refractive index as overcoat layer 108.

In one embodiment, diffracting optical element layer 100 is a square millimeter in size, with the thickness varying in size. In various embodiments, diffracting optical element layer 100 ranges in size from sub-millimeter to a few centimeters long. In one embodiment, diffracting optical element layer 100 is square in shape if looking at a top down view. It should be appreciated that diffracting optical element layer 100 is not limited to one size or shape.

In one embodiment, diffracting optical element layer 100 is comprised of a plastic material. In one embodiment, diffracting optical element layer 100 is comprised of a metal. In one embodiment, diffracting optical element layer 100 is comprised of a metalized plastic material. For example, diffracting optical element layer 100 could be comprised of a plastic material that is sprinkled with a metal material, such as aluminum, to give diffracting optical element layer 100 more reflective properties. In one embodiment, diffracting optical element layer 100 is comprised of silver ink. It should be appreciated that diffracting optical element layer 100 can be comprised of a wide varieties of materials and is only limited by the necessity of diffracting optical element layer 100 to be at least partially reflective. In one embodiment, diffracting optical element layer 100 is comprised of a material that is capable of coupling with object 112.

FIG. 1a shows overcoat layer 108 covering the top surfaces and sidewalls of diffracting optical element layer 100. In one embodiment, overcoat layer 108 is transparent to at least one wavelength of light and opaque to at least one wavelength of light. In one embodiment, overcoat layer 108 is opaque to visible light. In one embodiment, overcoat layer 108 is transparent to infrared light with a wavelength of substantially 850 nanometers. In one embodiment, overcoat layer 108 is thick enough that the top surface 130 of overcoat layer 108 is substantially flat and parallel relative to bottom surface 102 of diffracting optical element layer 100. Thus a substantially flat top surface 130 of overcoat layer 108 that is opaque to visible light disguises diffracting optical element layer 100 and allows the covert label structure to be difficult to detect with the human eye.

In one embodiment, overcoat layer 108 covers only diffracting optical element layer 100. In one embodiment, overcoat layer 108 covers diffracting optical element layer 100 as well as part of object 112. In one embodiment, overcoat layer 108 covers diffracting optical element layer 100 and adhesive layer 110. It should be appreciated that overcoat layer 108 can be, but is not limited to, ink or paint.

In one embodiment, the covert label structure comprises adhesive layer 110. In one embodiment, adhesive layer 110 is coupled to bottom surface 102 of diffracting optical element layer 110. In one embodiment, adhesive layer 110 is comprised of commercially available adhesives which are capable of adhering to cardboard, paper, plastic, glass, and other materials. In one embodiment, adhesive layer 110 adheres to object 112 when placed in contact with object 112. In one embodiment, the covert label structure does not include adhesive layer 110. In one embodiment, the covert label structure is coupled with object 112 with a means other than adhesive layer 110.

In one embodiment, object 112 is packaging for a manufactured product. For example, object 112 could be packaging made of cardboard. It should be appreciated that object 112 could be, but is not limited to, cardboard, paper, rubber, plastic, glass, and other materials. In one embodiment, object 112 is a manufactured product.

Figure 1B:
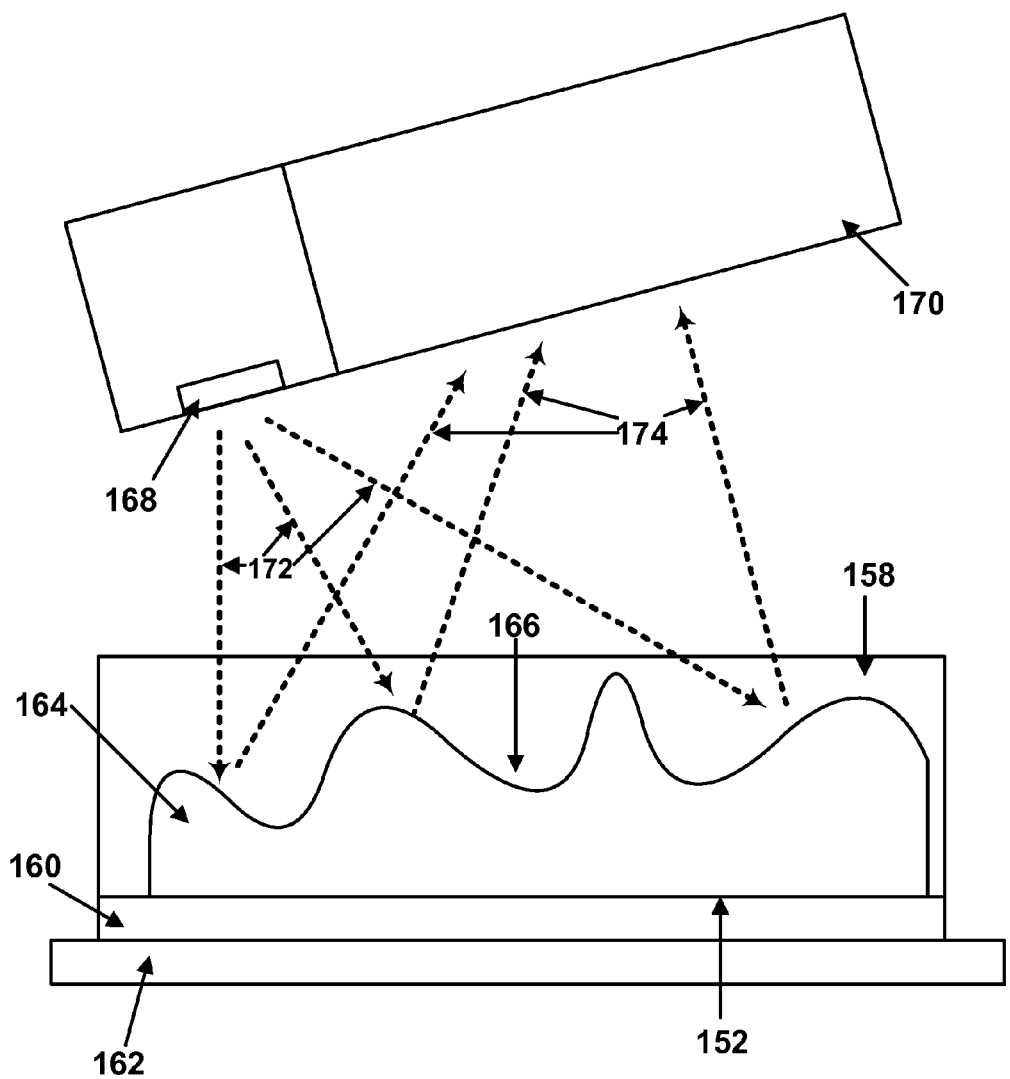
FIG. 1b illustrates an example of a covert label structure in accordance with an embodiment of the present technology.

Reference will now be made to FIG. 1b, a cross-section view of an example covert label structure shown in accordance with embodiments of the present technology. FIG. 1b depicts a covert label structure similar to that of FIG. 1a. FIG. 1b includes, diffracting optical element layer 164, overcoat layer 158, adhesive layer 160, object 162, light source 168, light detector 170, projected light 172 and reflected light 174. FIG. 1b comprises components and portions of the present technology that may or may not be used with different embodiments of the present technology and should not be construed to limit the present technology.

In one embodiment, diffracting optical element layer 164 comprises bottom surface 152 that is substantially flat relative to the top surface 166. In one embodiment, diffracting optical element layer 164 comprises different portions of a top surface that is curved such as curved top surface 166. In one embodiment, the diffracting optical element layer is a combination of curved and flat surfaces. For example, the diffracting optical element layer could be a combination of top surfaces 104 and 106 of diffracting optical element layer 100 of FIG. 1*a* and curved top surface 166 of diffracting optical element layer 164.

In one embodiment, light source 168 is able to project light of a particular wavelength or range of wavelengths. In one embodiment, light source 168 projects a parallel monochromatic beam of light. In one embodiment, light source 168 projects infrared light with a wavelength of substantially 850 nanometers. In one embodiment, light source 168 projects light that will pass through, or is transparent to, overcoat layer 158 and will be reflected by diffracting optical element layer 164 or diffracting optical element layer 100 of FIG. 1*a*. In one embodiment, light source 168 projects light that is transparent to overcoat layer 158 and will also project light that will be reflected by overcoat layer 158. It should be appreciated that light source 168 could be, but is not limited to, a light emitting diode (LED), a laser, or a light bulb. In one embodiment, light source 168 is a commercially available laser commonly used in a compact disc (CD) player. In one embodiment, light source 168 is incorporated into a handled device with light detector 170. For example, light source 168 could be incorporated into a cellar telephone handheld device.

In one embodiment, projected light 172 of FIG. 1*b* represents light that is projected by light source 168. It should be appreciated that projected light 172 is not limited to three directions of projections as is depicted in FIG. 1*b*. In one embodiment, projected light 172 is transmitted through overcoat layer 158. In one embodiment, project light 172 is reflected off of the top surfaces and sidewalls of the diffracting optical element layer and becomes reflected light 174. In one embodiment, reflected light 174 is reflected in a predetermined pattern.

In one embodiment, light detector 170 detects light that is projected by light source 168 and is reflected by the diffracting optical element layer of the covert label structure. In one embodiment, light detector 170 is a camera. It should be appreciated that light detector 170 could be, but is not limited to, a camera, a digital camera, a charged-couple device (ccd) camera, or another type of light sensing technology. In one embodiment, light detector 170 is an array of charged-couple devices covered in a transparent medium and mounted in a fashion that will allow the covert label structure to easily be scanned by light detector 170 in conjunction with light source 168.

In one embodiment, light detector 170 is coupled with an authenticating module capable of receiving information from light detector 170 regarding light that is projected by light source 168 and is reflected by the diffracting optical element layer of the covert label structure. The authenticating module is then able to determine if the information represents a depth profile that reflects light in a predetermined pattern. Such a determination would be a means of authenticating the covert label structure. In one embodiment, light source 168, light detector 170 and the authenticating module are all incorporated into a handheld device. In one embodiment, the authenticating module includes a database of information that represents authentic depth profiles of authentic covert label structures that reflect light in a predetermined pattern. In one embodiment, the authenticating module does not contain the described database, but is able to wirelessly access the described database.

Figure 2A:
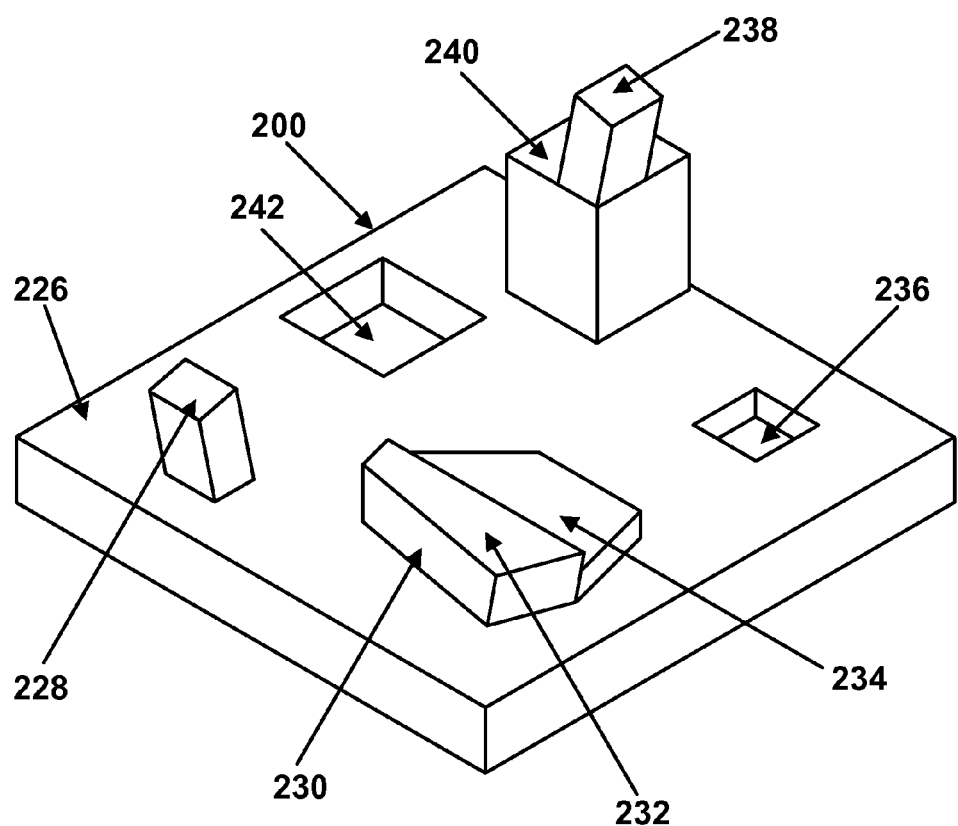
FIG. 2a illustrates an example of a covert label structure in accordance with an embodiment of the present technology.

Reference will now be made to FIG. 2*a*, a three dimensional view of an example diffracting optical element layer shown in accordance with embodiments of the present technology. FIG. 2*a* includes diffracting optical element layer 200, top surfaces 228, 232, 234, 236, 238, 240, and 242 of diffracting optical element layer 200, and sidewall 230 of diffracting optical element layer 200. FIG. 2*a* comprises components and portions of the present technology that may or may not be used with different embodiments of the present technology and should not be construed to limit the present technology. It should be appreciated that FIG. 2*a* is shown only as an example. For example, FIG. 2*a* is shown with various components being raised or lowered from top surface 226.

FIG. 2*a* depicts one embodiment of a diffracting optical element layer in which there are more than two portions of the top surface of diffracting optical element layer 200 which are different in thickness relative to the bottom surface of diffracting optical element layer 200. For example, top surfaces 228, 232, 234, 236, 238, 240, and 242 are all different portions of the top surface of diffracting optical element layer 200 and all different in thickness relative to the bottom surface of diffracting optical element layer 200. In one embodiment, diffracting optical element layer 200 has portions of the top surface that are parallel to the bottom surface of diffracting optical element layer 200 and portions that are not parallel. For example, top surface 228 is set at an angle relative to the bottom surface of diffracting optical element layer 200 as well as top surface 226. It should be appreciated that diffracting optical element layer 200 can have any number of portions of the top surface different in thickness relative to the bottom surface of diffracting optical element layer 200. In one embodiment, diffracting optical element layer 200 has sidewalls, such as sidewall 230, which are perpendicular to the bottom surface of diffracting optical element layer 200. It should be appreciated that the sidewalls of diffracting optical element layer 200 do not need to be perpendicular to the bottom surface of diffracting optical element layer 200 and need not be parallel or perpendicular relative to other sidewalls of diffracting optical element layer 200.

Figure 2B:
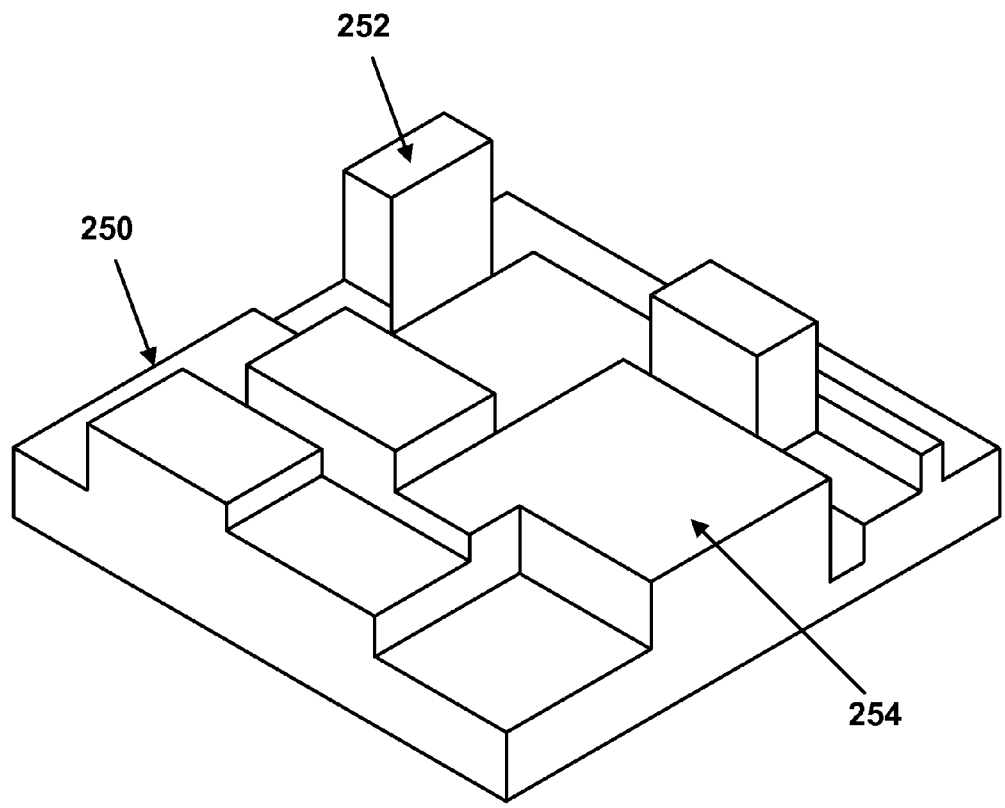
FIG. 2b illustrates an example of a covert label structure in accordance with an embodiment of the present technology.

Reference will now be made to FIG. 2*b*, a three dimensional view of an example diffracting optical element layer shown in accordance with embodiments of the present technology. FIG. 2*b* includes diffracting optical element layer 250, top surfaces 252 and 254 of diffracting optical element layer 250. FIG. 2*b* comprises components and portions of the present technology that may or may not be used with different embodiments of the present technology and should not be construed to limit the present technology.

FIG. 2*b* is drawn to show a diffracting optical element layer in which different portions of the top surface are different heights relative to the bottom surface of the diffracting optical element layer. For example, top surfaces 252 and 254 are both different portions of the top surface of diffracting optical element layer 250. Additionally, neither top surface 252, top surface 254, nor any other single portion of the top surface of diffracting optical element layer 250 comprise a majority portion of the total surface area of which the portions of the top surface of diffracting optical element layer 250 comprise.

Operation

Reference will now be made to embodiments in accordance with the present technology including methods and processes for manufacturing a covert labeling structure and methods for authenticating a covert labeling structure.

Figure 3:
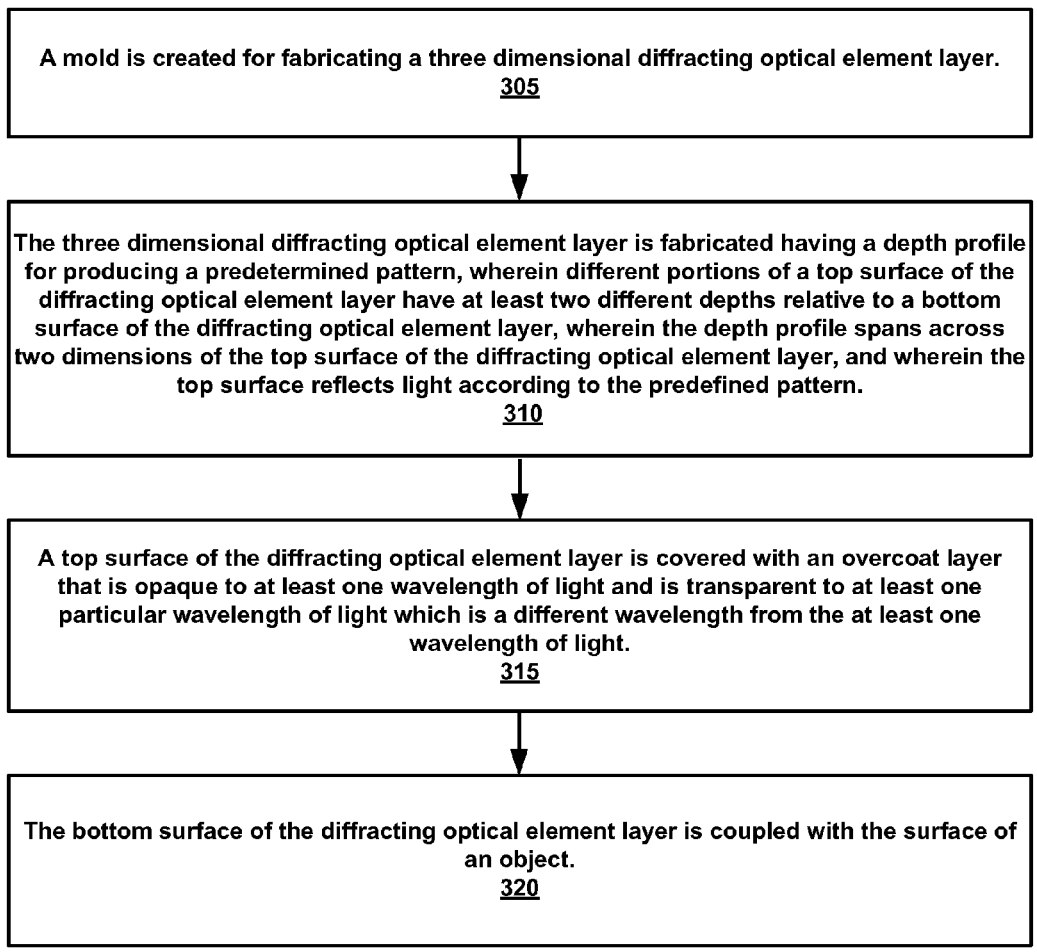
FIG. 3 illustrates a flowchart of an example method for manufacturing a covert label in accordance with an embodiment of the present technology.

FIG. 3 illustrates process 300, a method for manufacturing a covert labeling structure, in accordance with one embodiment of the present invention. It should be appreciated that process 300 is a method describing one example for manufacturing a covert labeling structure and not every step is required to manufacture a covert labeling structure in accordance with the present technology. Moreover, steps in process 300 need not be performed in the order described.

In one embodiment, at step 305 a mold is created for fabricating a three dimensional diffracting optical element layer.

At step 310, the three dimensional diffracting optical element layer is fabricated having a depth profile for producing a predetermined pattern, wherein different portions of a top surface of the diffracting optical element layer have at least two different depths relative to a bottom surface of the diffracting optical element layer, wherein the depth profile spans across two dimensions of the top surface of the diffracting optical element layer, and wherein the top surface reflects light according to the predefined pattern.

In one embodiment, step 310 is carried out using roll to roll printing for the diffracting optical element layer in plastic. In one embodiment, large sheets of a diffracting optical element layer are printed using roll to roll printing after which the large sheets are cut into smaller portions used for the covert label structure. In one embodiment, digital printing is used to create the diffracting optical element layer. In one embodiment, printing is used to print multiple diffracting optical element layers. In one embodiment, the printing is able to change the design and shape of the diffracting optical element layer while the print is taking place so that the multiple diffracting optical element layers are not all identical.

In one embodiment, step 310 is preceded by creating a mold in silicon for the diffracting optical element layer. After which step 310 is carried out, in one embodiment, by replicating the silicon mold is in a plastic material. Silicon can be easily shaped but may not be hard enough to use as a mold for materials needed to fabricate a diffracting optical element layer. Thus this method may be used to create a mold in silicon for a wide variety of shapes and sizes and then replicating the mold in a harder material. In one embodiment, the replicated mold is comprised of a plastic material which is harder than the material in which the diffracting optical element layer is to be comprised of.

At step 315, a top surface of the diffracting optical element layer is covered with an overcoat layer that is opaque to at least one wavelength of light and is transparent to at least one particular wavelength of light which is a different wavelength from the at least one wavelength of light.

In one embodiment, at step 320, process 300 further comprises coupling the bottom surface of the diffracting optical element layer with a surface of an object.

Figure 4:
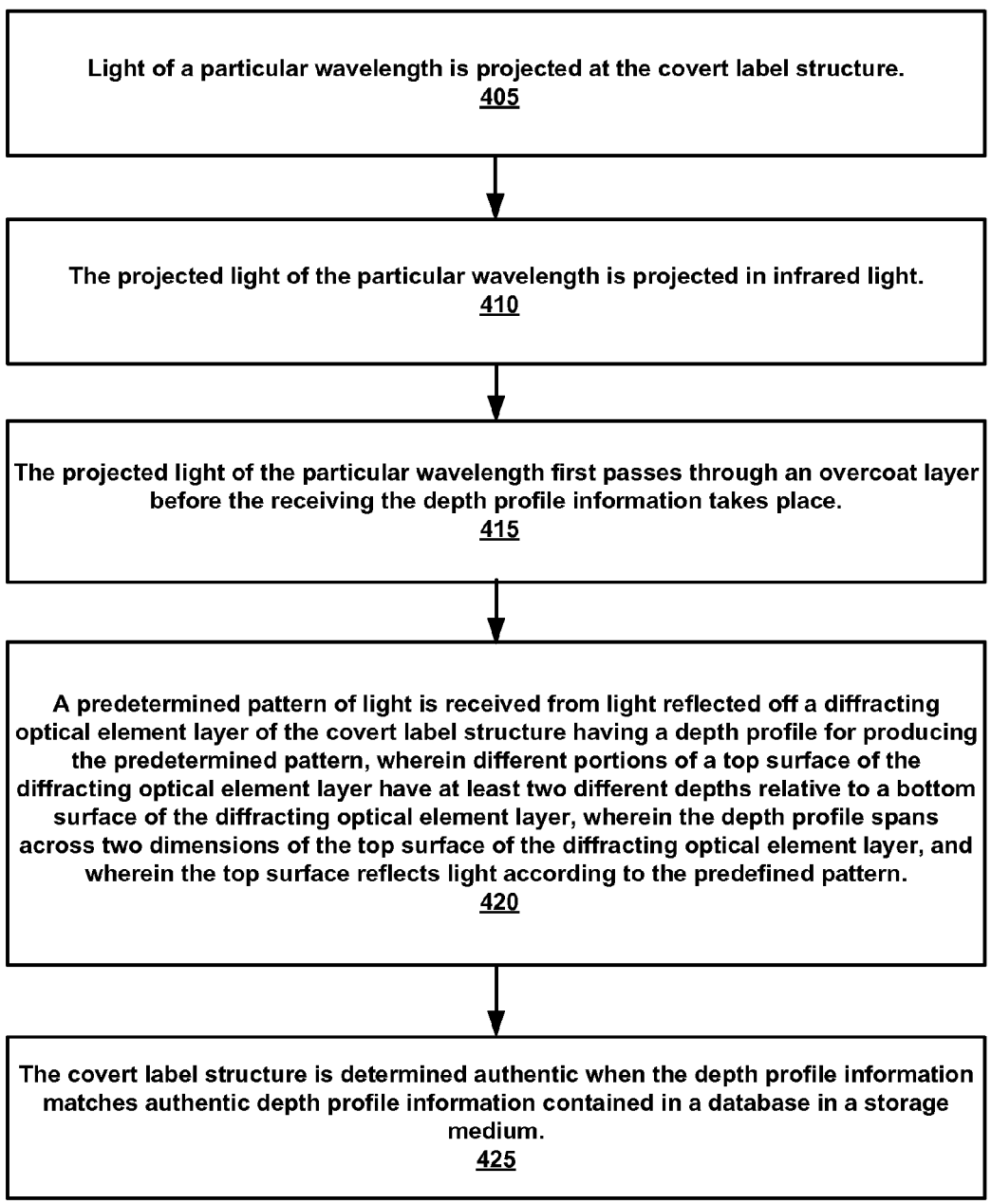
FIG. 4 illustrates a flowchart of an example method for authenticating a covert label in accordance with an embodiment of the present technology.

FIG. 4 illustrates process 400, a method for authenticating a covert labeling structure, in accordance with one embodiment of the present invention. It should be appreciated that process 400 is a method describing one example for authenticating a covert labeling structure and not every step is required to authenticate a covert labeling structure in accordance with the present technology. Moreover, steps in process 400 need not be performed in the order described.

At step 405, light of a particular wavelength is projected at the covert label structure. In one embodiment, the particular wavelength of light is infrared light.

In one embodiment, at step 410, the projected light of the particular wavelength is projected in infrared light.

In one embodiment, at step 415, the projected light of the particular wavelength first passes through an overcoat layer before the receiving of the depth profile information takes place.

At step 420, a predetermined pattern of light is received from light reflected off a diffracting optical element layer of the covert label structure having a depth profile for producing the predetermined pattern, wherein different portions of a top surface of the diffracting optical element layer have at least two different depths relative to a bottom surface of the diffracting optical element layer, wherein the depth profile spans across two dimensions of the top surface of the diffracting optical element layer, and wherein the top surface reflects light according to the predefined pattern.

At step 425, the covert label structure is determined authentic when the depth profile information matches authentic depth profile information contained in a database in a storage medium.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A covert label structure comprising:
   a three dimensional diffracting optical element layer having a depth profile for producing a predetermined pattern, wherein different portions of a top surface of said diffracting optical element layer have different depths relative to a bottom surface of said diffracting optical element layer, wherein aid depth profile spans across two dimensions of said top surface of said diffracting optical element layer, and wherein said top surface reflects light according to said predefined pattern wherein said diffracting optical element layer is a printed kinoform; and
   an overcoat layer over said top surface of said diffracting optical element layer wherein said overcoat layer is opaque to at least one wavelength of light.

2. The covert label structure of claim 1, wherein said overcoat layer is at least partially transparent for at least one particular wavelength of light.

3. The covert label structure of claim 2, wherein said diffracting optical element layer is configured to reflect light at said at least one particular wavelength of light.

4. The covert label structure of claim 3, wherein said at least one wavelength of light is infrared light with a wavelength of substantially 850 nanometers.

5. The covert label structure of claim 1, wherein said overcoat layer is substantially flat relative said bottom surface, such that said covert label has a substantially constant depth profile.

6. The covert label structure of claim 1, wherein said overcoat layer is opaque to a range of visible light.

7. The covert label structure of claim 1 further comprising:
   an adhesive layer coupled with said bottom surface of said diffracting optical element layer, wherein said adhesive layer adheres to a surface of an object.

8. The covert label structure of claim 1 wherein said bottom surface of said diffracting optical element layer is configured to be coupled to a surface of an object.

9. A method for manufacturing a covert label, said method comprising:
   fabricating a three dimensional diffracting optical element layer using printed kinoform having a depth profile for producing a predetermined pattern, wherein different portions of a top surface of said diffracting optical element layer have at least two different depths relative to a bottom surface of said diffracting optical element layer, wherein said depth profile spans across two dimensions of said top surface of said diffracting optical element layer, and wherein said top surface reflects light according to said predefined pattern; and covering a top surface of said diffracting optical element layer with an overcoat layer that is opaque to at least one wavelength of light and is transparent to at least one particular wavelength of light which is a different wavelength from said at least one wavelength of light.

10. The method of claim 9, further comprising;
creating a mold for said fabricating said three dimensional diffracting optical element layer.

11. The method of claim 9, further comprising:
coupling said bottom surface of said diffracting optical element layer with a surface of an object.

12. A method for authenticating a covert label structure, said method comprising:
projecting light of a particular wavelength at said covert label structure;
receiving a predetermined pattern of light from light reflected off a diffracting optical element layer of said covert label structure having a depth profile for producing said predetermined pattern, wherein different portions of a top surface of said diffracting optical element layer have at least two different depths relative to a bottom surface of said diffracting optical element layer, wherein said depth profile spans across two dimensions of said top surface of said diffracting optical element layer, and wherein said top surface reflects light according to said predefined pattern wherein said diffracting optical element layer is a printed kinoform; and
determining said covert label structure is authentic if said depth profile information matches authentic depth profile information contained in a database in a storage medium.

13. The method of claim 12, wherein said projecting said light of said particular wavelength first passes through an overcoat layer before said receiving said depth profile information takes place.

14. The method of claim 12, wherein said projecting said light of said particular wavelength is projected in infrared light.

* * * * *